United States Patent [19]

Worthington

[11] 4,297,069
[45] Oct. 27, 1981

[54] CHAIR CARRIER

[76] Inventor: Byron C. Worthington, P.O. Box 434, Gainesville, Fla. 32602

[21] Appl. No.: 109,690

[22] Filed: Jan. 2, 1980

[51] Int. Cl.³ .............................................. B60R 9/06
[52] U.S. Cl. ............................. 414/462; 224/42.03 R; 224/42.44; 414/921
[58] Field of Search ............... 414/462, 463, 466, 545, 414/921; 224/42.03 R, 42.03 B, 42.03 A, 42.07, 42.2, 42.21, 42.44; 187/11

[56] References Cited

U.S. PATENT DOCUMENTS

| | | | |
|---|---|---|---|
| 1,723,320 | 8/1929 | Zibelman | 414/466 |
| 3,039,634 | 6/1962 | Hobson et al. | 414/462 |
| 3,754,672 | 8/1973 | Blomquist et al. | 414/462 |
| 3,837,513 | 9/1974 | Adamek | 414/462 |
| 4,039,096 | 8/1977 | McAllister | 414/462 |
| 4,050,616 | 9/1977 | Mosow | 224/42.03 B |
| 4,134,509 | 1/1979 | Clement | 414/462 |

FOREIGN PATENT DOCUMENTS

| | | | |
|---|---|---|---|
| 2807567 | 8/1978 | Fed. Rep. of Germany | 414/462 |
| 2355694 | 1/1978 | France | 224/42.03 B |
| 1182677 | 3/1970 | United Kingdom | 414/545 |

Primary Examiner—Leslie J. Paperner
Attorney, Agent, or Firm—Harvey B. Jacobson

[57] ABSTRACT

A wheelchair carrier for attachment to the rear of a motor vehicle comprises a housing containing two vertical slide bars mounting a cross member therebetween for vertical displacement, a pair of rearwardly extending projections mounted on the cross member and a winch cable attached to the cross member to effect motorized vertical movement thereof. The projections can be inserted through appropriate openings in a wheelchair and the winch activated to lift the wheelchair under a hood contained on the housing. The hood is structured so as to inhibit sliding of the wheelchair from the projections and thus prevent removal of the wheelchair from the carrier. A strap may be disposed about the wheelchair to hold it in secure engagement within the housing for transportation by the motor vehicle.

7 Claims, 5 Drawing Figures

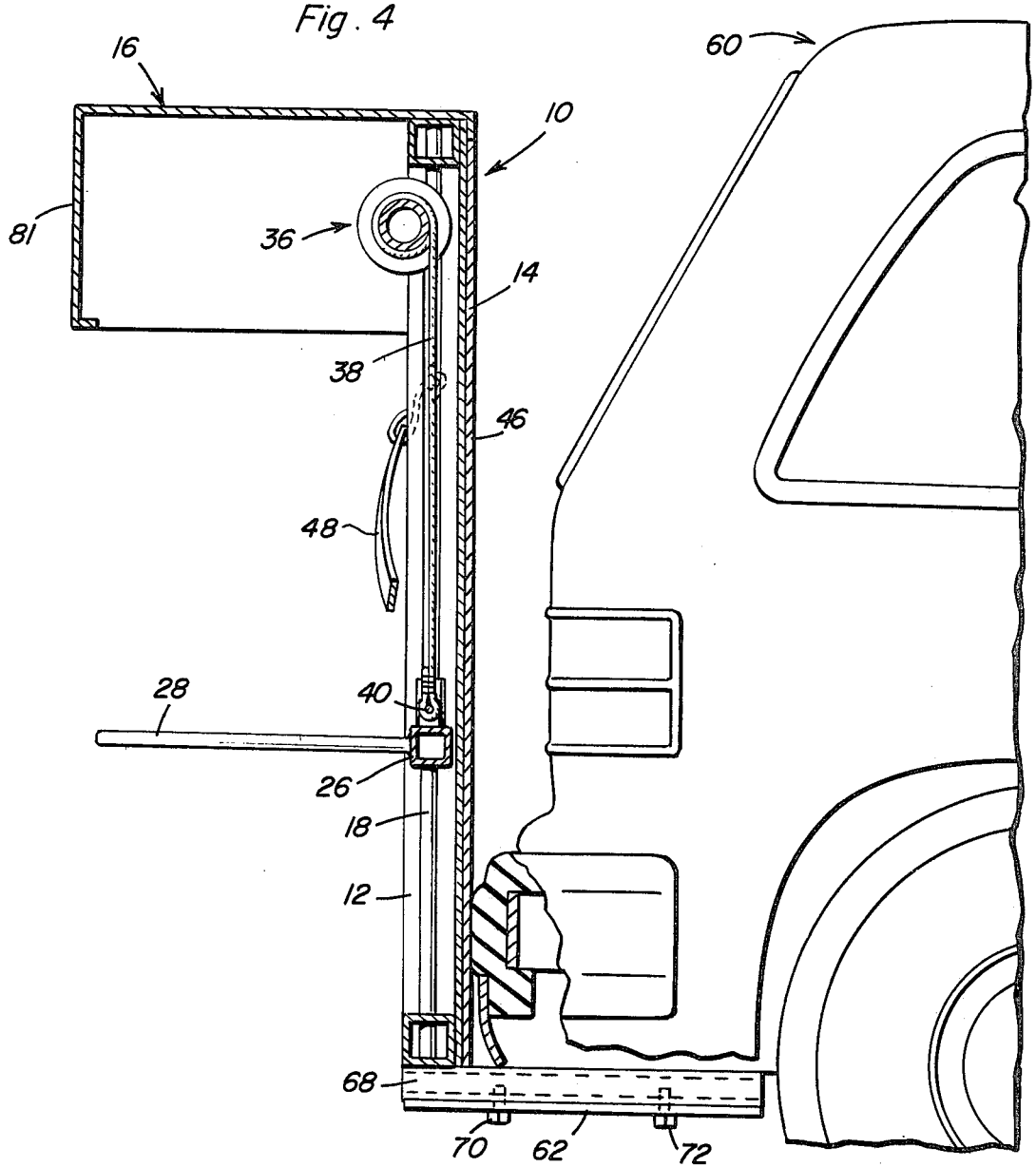
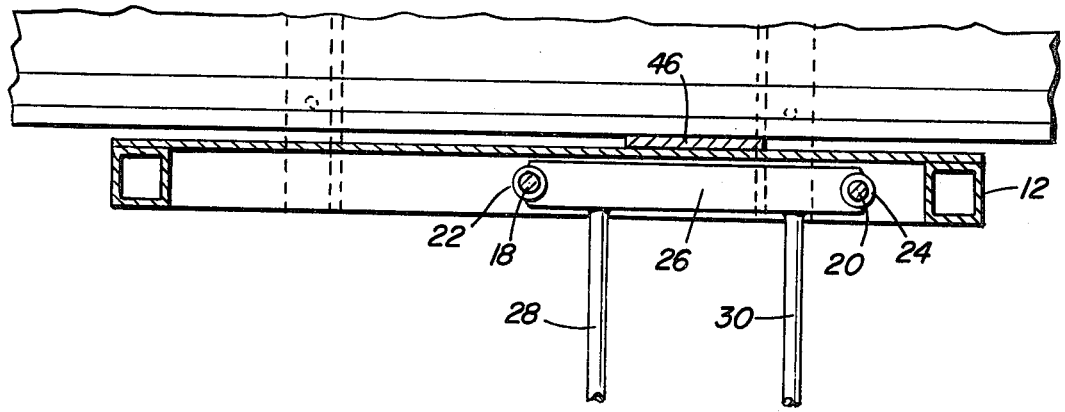

CHAIR CARRIER

BACKGROUND OF THE INVENTION

1. Field of the Invention

This invention relates to motor vehicle attachments for the transportation of large objects and especially to such attachments adapted for carrying a wheelchair.

2. Discussion of Related Art

Various wheeled vehicle carrier attachments for motor vehicles have been suggested in the past. For instance, U.S. Pat. No. 3,937,376, issued Feb. 10, 1976, to Ewing, shows a vehicle support for a wheelchair comprising a frame having opposed side members defining a space for receiving the large wheels of the wheelchair. A retainer support is positioned on the frame and engages a rearward extending member on the wheelchair to hold the wheelchair securely. However, no racks for carrying wheelchairs are known which enable one to easily support a collapsed wheelchair in carrying position without undue manual labor.

SUMMARY OF THE INVENTION

One object of the present invention is to provide a chair carrier which gives the user of a wheelchair an easy and affordable way of transporting the wheelchair.

Another object of the present invention is to provide a chair carrier which can easily be mounted on any type of motor vehicle.

A further object of the present invention is to provide a chair carrier which will automatically raise and lower a wheelchair into carrying position with no manual labor on the part of the user.

In accordance with the above objects, the chair carrier of the present invention includes a rectangular frame having a pair of slide bars disposed vertically therein, a sleeve is slidably disposed on each of the bars with a cross member connecting the sleeves. A pair of rearwardly extending projections are attached to the cross member for supporting a wheelchair below the arm rest of the wheelchair. A cover is attached to the top of the framework and houses a winch. The cable of the winch is attached to the cross member and causes powered lifting of the cross member with attached wheelchair. The device is operated by a key and toggle switch combination. The key switch provides security against theft, while the toggle switch controls raising and lowering of the wheelchair.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a side elevational sectional view taken substantially along a plane passing through section line 4—4 of FIG. 3.

FIG. 5 is a top plan sectional view taken substantially along a plane passing through section line 5—5 of FIG. 3.

DESCRIPTION OF THE PREFERRED EMBODIMENT

Figure 1:
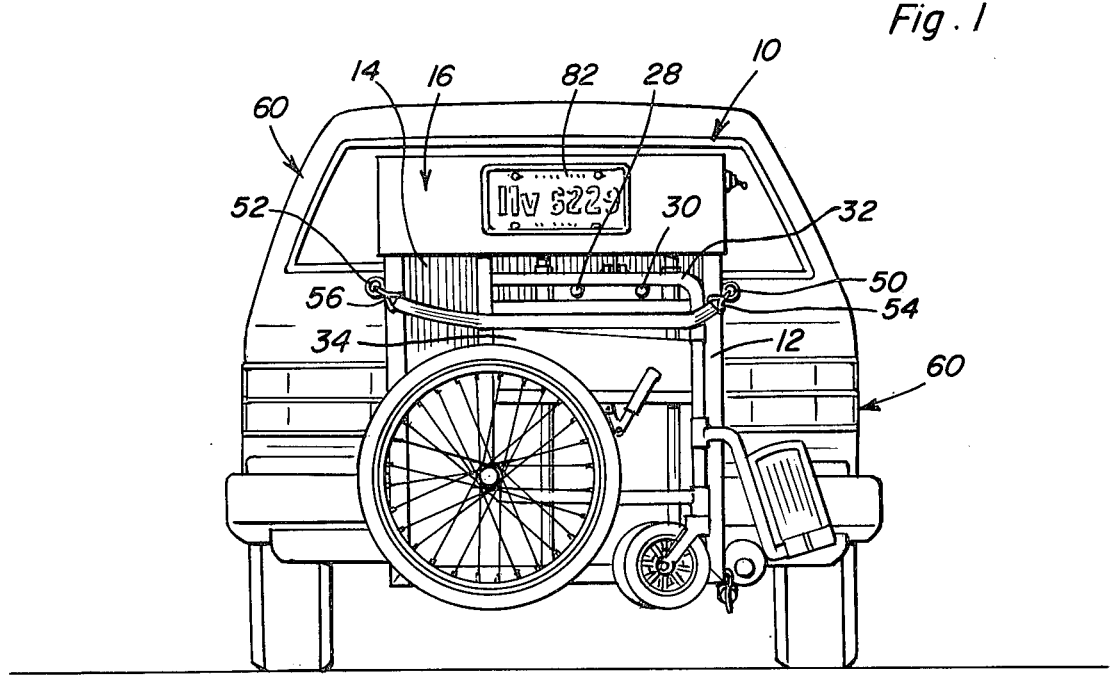
FIG. 1 is an elevational view of the chair carrier as attached to a motor vehicle.
Figure 2:
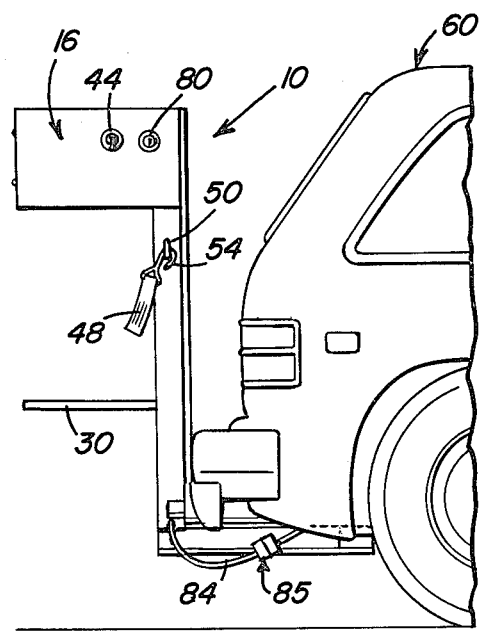
FIG. 2 is a side elevational view of the chair carrier.
Figure 3:
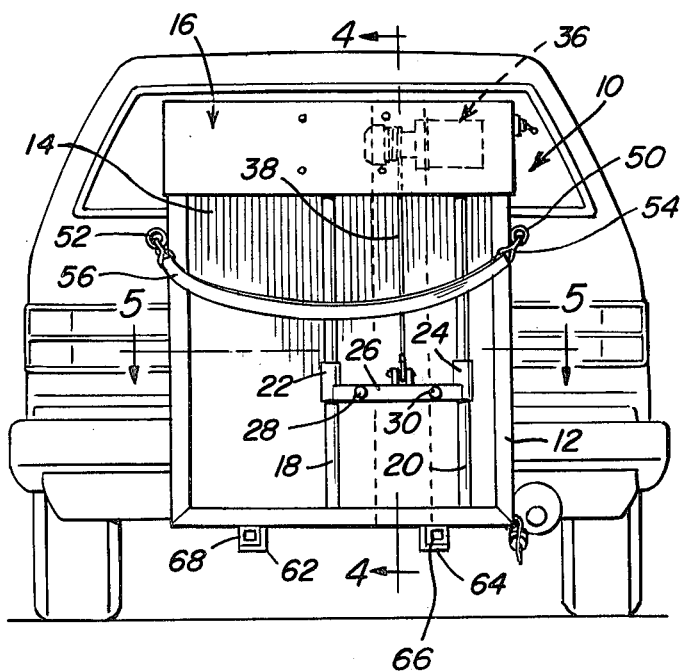
FIG. 3 is an elevational view of the chair carrier shown in the lowered position ready to receive a wheelchair.

Now with reference to the drawings, a chair carrier incorporating the principles and concepts of the present invention and generally referred to by the reference numeral 10 will be described in detail. The carrier 10 includes a substantially rectangular framework 12 comprised of four square tubular members welded at their corners. A metal plate 14 is welded to the front of frame 12 and a hood 16 is welded to the top of the frame and extends rearwardly therefrom.

A pair of vertical side bars 18 and 20 are inserted into the upper and lower frame members and held in spaced parallel relation thereby. A pair of tubular sleeves 22 and 24 are mounted on the slide bars 18 and 20 respectively and connected by a horizontally disposed cross member 26. Member 26 can also be a square tubular bar. A pair of stiff, horizontally disposed rod-like projections 28 and 30 are welded to the cross member 26 and extend outwardly therefrom. Projections 28 and 30 are each approximately 11 inches long and thus can easily slide beneath the arm rest 32 of wheelchair 34, shown in FIG. 1 in its collapsed, raised position. A winch 36 is mounted beneath hood 16 for protection from the environment and includes a winch cable 38 which extends down and is attached to the cross member 26 by pin 40. Thus it can easily be seen that with the projections 28 and 30 inserted as shown in FIG. 1, winch 36 can be actuated by depressing a toggle switch shown generally at 44 whereupon the chair will be raised to a position as shown in FIG. 1 partially disposed beneath hood 16 and protected from the environment. A backing plate 46 is welded to plate 14 and serves to strengthen that plate in the area of slide bars 18 and 20 and the mounting of winch 36.

Once the chair is in position and lifted onto the chair carrier, a rubber strap 48 is stretched between eyelets 50 and 52 and is engaged with the eyelets by use of hooks 54 and 56. Thus the chair is firmly pressed against the plate 14 and held in a secure position.

In order to mount the chair carrier 10 onto an automobile 60, a pair of forwardly spaced projecting angle sections 62 and 64 are welded to the bottom member frame 12 in diverging relation to each other. Further, a pair of square tubular members 66 and 68 are welded to the frame of the automobile 60 and project rearwardly therefrom to engage the angle sections 62 and 64 which slide onto members 66 and 68 until the lower member of frame 12 rests atop the members. Bolts, such as shown at 70 and 72, are then inserted through pre-drilled openings in the angle sections and threadedly engage tubular members 66 and 68 to hold the chair carrier firmly to the automobile. Accordingly, it can be seen that the chair carrier can be quickly and easily mounted and dismounted from the automobile 60 for use as needed.

A key operated switch 80 is also mounted on the hood 16 and provides a security device against tampering with the mounted wheelchair. It should be noted that the wheelchair cannot be removed from the device without lowering the winch 36 since the hood 16 includes a rear depending panel 81 which covers a portion of the wheelchair and inhibits sliding of the wheelchair from projections 28 and 30. Also, panel 81 serves as a convenient location to mount a license plate 82.

Power is provided to the winch 36 through wires 84 from the electrical system of vehicle 60. Wires 84 can conveniently be run up through the interior of one of the hollow tubes of frame 12 and taken from the tube directly through switches 80, 44 and then to the winch 36. Of course, a connector 85 should be used to allow wires 84 to be easily removed when taking the chair carrier 10 off car 60.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A wheeled vehicle carrier for motor vehicles comprising: a framework, at least one vertical slide rail attached to said framework; a slide disposed on and movable along said one slide rail; mounting means attached to said slide for mounting a wheeled vehicle thereon; power means for causing powered motion of said slide along said one slide rail; and further including a hood disposed atop said frame and extending outwardly therefrom to cover a portion of said slide and cover a portion of a wheeled vehicle mounted upon said slide in a carrying position, said hood being spaced from said mounting means so as to inhibit the removal of a mounted wheeled vehicle from said mounting means when said slide has moved the wheeled vehicle in a vertical position adjacent said hood.

2. The device as defined in claim 1 wherein said power means includes a winch, said winch being mounted in said hood and having a cable extending downwardly fastened to said slide.

3. The device as defined in claim 2 and further including a second vertical slide rail, said slide extending between said at least one slide rail and said second slide rail.

4. The device as defined in claim 1 and further including a strap detachably extending laterally of said frame for holding a wheeled vehicle in position on said slide.

5. The device as defined in claim 4 wherein said mounting means includes a pair of outwardly extending projections fixedly mounted to said slide.

6. The device as defined in claim 5 wherein said hood includes a vertically depended panel positioned so as to cover a portion of said mounted vehicle and is spaced outwardly from said projections so as to inhibit removal of said mounted vehicle outwardly from said projections when said wheeled vehicle is moved in a vertical position adjacent said panel.

7. The device as defined in claim 1 including motor vehicle mounting means comprising a pair of rearwardly extending bars adapted to be fixedly attached to a motor vehicle; and a pair of forwardly extending members attached to said frame and adapted to be slidably received on said bars.

* * * * *